(12) United States Patent
Chen

(10) Patent No.: US 6,405,406 B1
(45) Date of Patent: Jun. 18, 2002

(54) DEVICE CAPABLE OF COLLECTING AND DRAWING DUST

(76) Inventor: Peter Chen, No. 52, Ta Chou Road, Shen Kang Hsian, Taichung Hsien (TW)

( * ) Notice: Subject to any disclaimer, the term of this patent is extended or adjusted under 35 U.S.C. 154(b) by 0 days.

(21) Appl. No.: 09/880,073

(22) Filed: Jun. 14, 2001

(51) Int. Cl.7 .................................................. A47L 5/38
(52) U.S. Cl. ............................ 15/331; 15/339; 83/100; 144/252.1; 408/67
(58) Field of Search .................... 15/310, 331, 339; 83/100; 144/252.1; 408/67

(56) References Cited

U.S. PATENT DOCUMENTS

| | | | | |
|---|---|---|---|---|
| 2,625,703 A | * | 1/1953 | Devau | 15/311 |
| 3,030,650 A | * | 4/1962 | Kiraly | 15/310 |
| 4,628,566 A | * | 12/1986 | Klapperich | 15/301 |
| 4,977,638 A | * | 12/1990 | Best | 144/252.1 |
| 5,606,767 A | * | 3/1997 | Crlenjak et al. | 15/301 |
| 6,154,919 A | * | 12/2000 | Hetko | 15/339 |
| 6,293,321 B1 | * | 9/2001 | Chiang | 144/114.1 |

* cited by examiner

Primary Examiner—Chris K. Moore
(74) Attorney, Agent, or Firm—Browdy and Neimark, P.L.L.C.

(57) ABSTRACT

A device is capable of collecting dust and drawing dust and is provided with a machine tool mounted thereon and externally connected with an extension tube. The device comprises a fixation seat for mounting the machine tool which has a first opening, and a second opening; a vacuum cleaner mounted in the interior of the fixation seat; a first window disposed slidably at the first opening of the fixation seat; a second window disposed slidably at the second opening of the fixation seat. By controlling the first window to remain open and the second window to remain close, the vacuum cleaner removes the dust produced by the machine tool. On the contrary, by controlling the first window to remain close and the second window to remain open, the second opening removes dust in other areas via the extension tube.

10 Claims, 4 Drawing Sheets

DEVICE CAPABLE OF COLLECTING AND DRAWING DUST

FIELD OF THE INVENTION

The present invention relates generally to a dust collecting device, and more particularly to a device capable of collecting and drawing dust.

BACKGROUND OF THE INVENTION

The conventional machine tool is provided in one side thereof with a first vacuum cleaner for drawing the dust produced by the machine tool. The first vacuum cleaner has only the dust collecting action and is poorly installed.

The finishing process of the factory produces the dust which often falls on the floor. As a result, a second vacuum cleaner is needed to remove the dust.

Such a combination as described above is not very convenient for the user, and such that additional equipments must be purchased at additional costs.

SUMMARY OF THE INVENTION

The present invention is intended to provide a device capable of collecting and drawing dust, which can be controlled to collecting dust from the machine or drawing dust for other areas.

It is another objective of the present invention to provide a device capable of collecting and drawing dust, which is simple in construction such that a machine tool can be added thereto.

The device of the present invention is provided with a machine tool mounted thereon. The device of the present invention can be externally connected with an extension tube. The device comprises a fixation seat has a housing with a mounting portion on which the machine tool is mounted, a first opening corresponding in location to the machine tool, a second opening located at a predetermined position; a vacuum cleaner mounted inside the fixation seat; a first window slidably disposed at the first opening of the fixation seat; a second window slidably disposed at the second opening of the fixation seat.

With the first window being opened and the second window being closed, the vacuum cleaner removes the dust produced by the machine tool. On the contrary, by keeping the first window closed and by keeping the second window opened, the dust in other areas can be removed by the second opening via the extension tube.

DETAILED DESCRIPTION OF THE INVENTION

Figure 1:
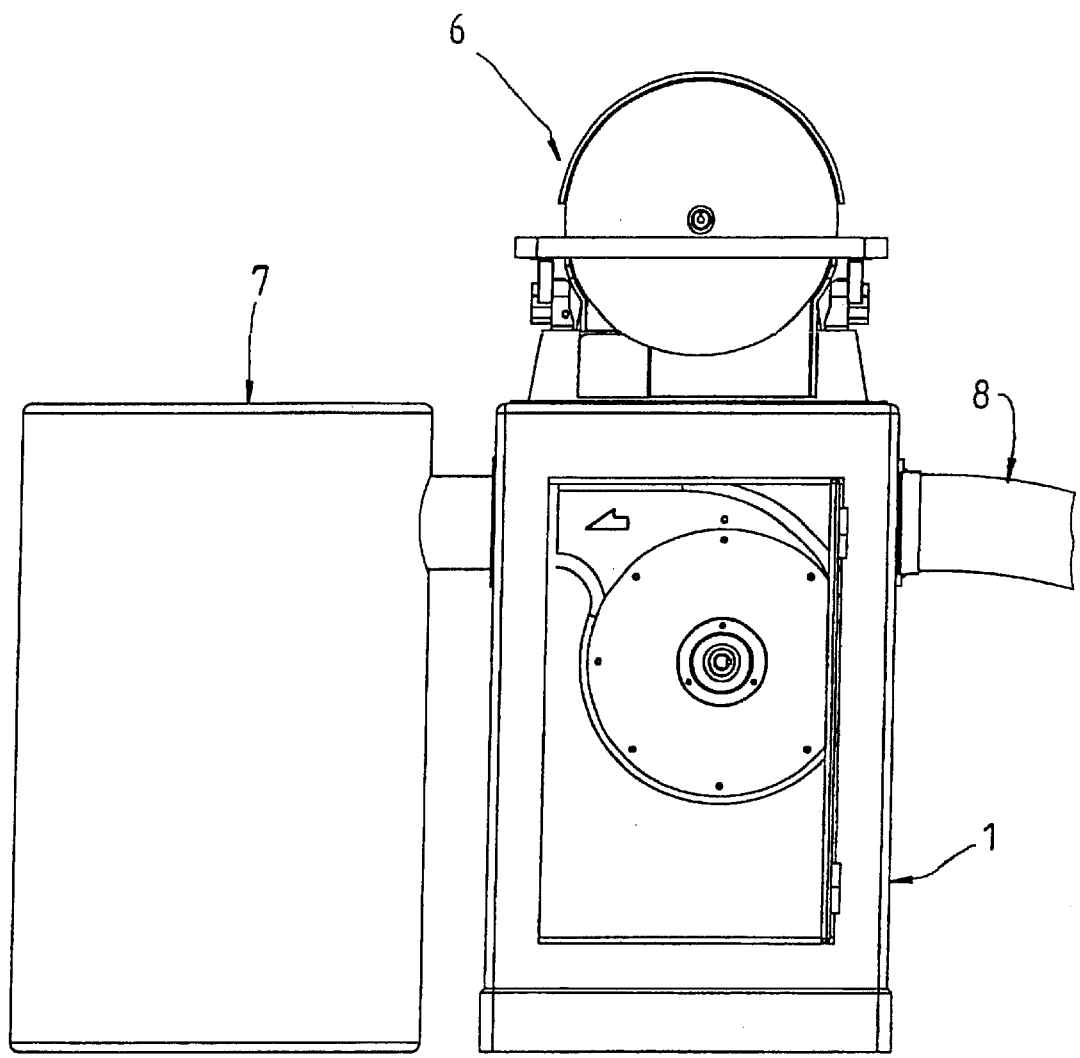
FIG. 1 shows a plan view of a preferred embodiment of the present invention along with the machine tool and the dust collecting bag.

As shown in FIG. 1, a device 1 of the preferred embodiment of the present invention is provided with a machine tool 6 mounted thereon, a dust collecting bag 7, and an extension tube 8 externally connected therewith.

Figure 2:
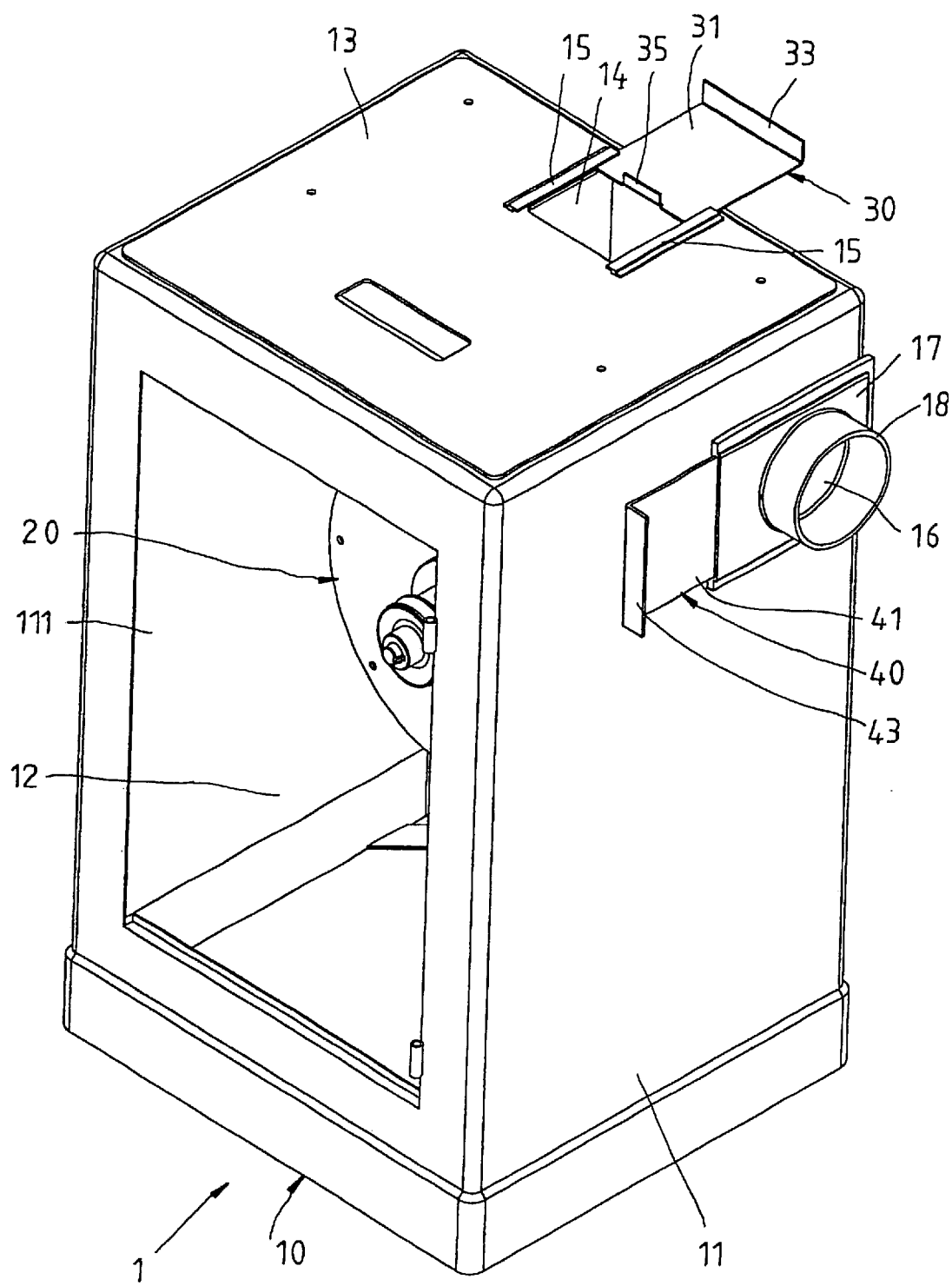
FIG. 2 is a perspective view of the preferred embodiment of the present invention to show that each opening is in the open state.
Figures 3, 4:
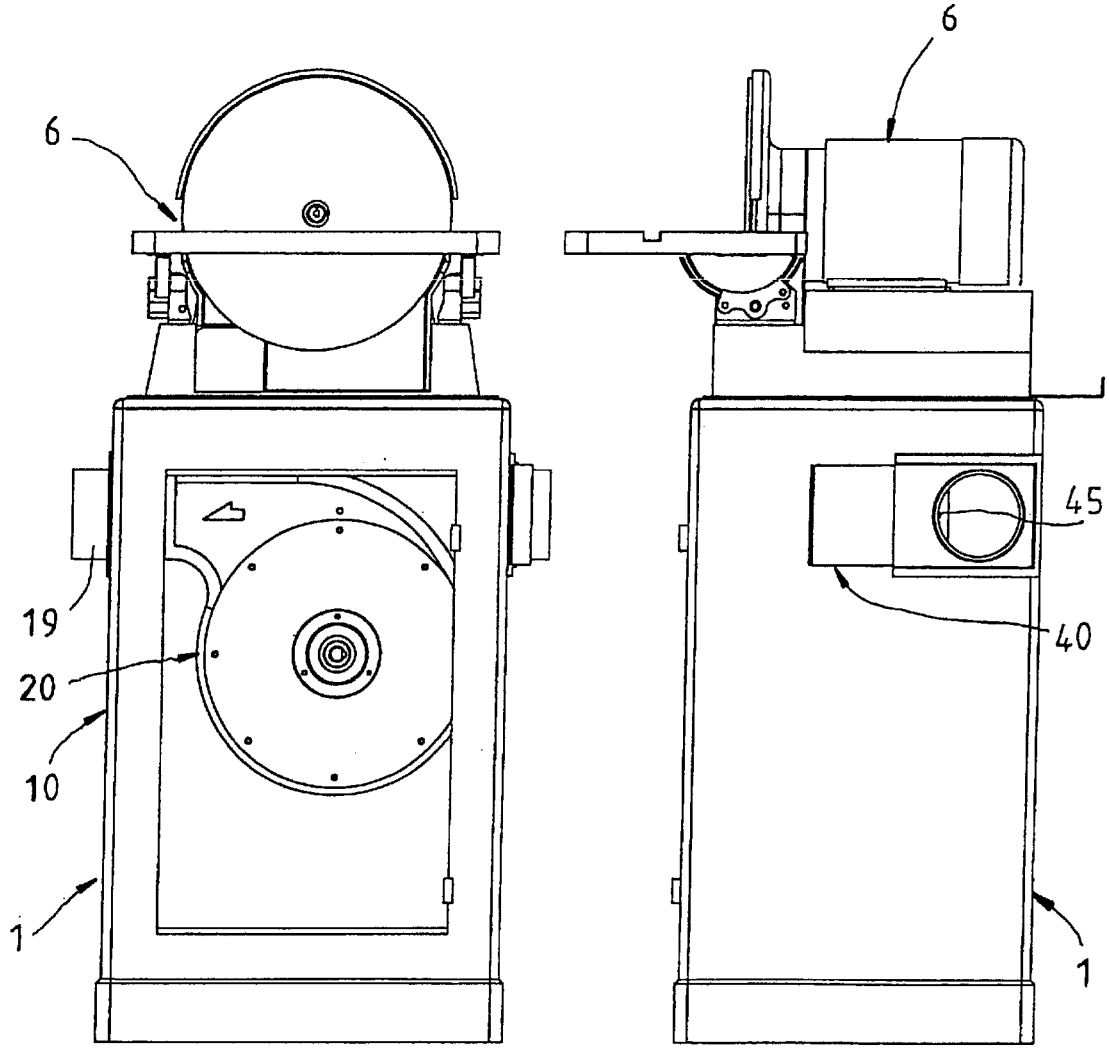
FIG. 3 shows a front view of the preferred embodiment of the present invention and the machine tool in combination.
FIG. 4 shows a side view of the preferred embodiment of the present invention and the machine tool in combination.

As shown in FIGS. 2–4, the device 1 of the present invention comprises the following components.

A fixation seat 10 is airtightly closed and has a housing 11 which is provided with a door opening 111 which can be covered with a door (not shown in the drawing), in the interior with a receiving cell 12, a mounting portion 13 located at the top thereof for mounting the machine tool 6, a first opening 14 in a square shape and corresponding in location to the machine tool 6, two confining edges 15 formed in two sides of the first opening 14, a second opening 16 in a square shape and disposed at a predetermined position of the side of the housing 11, a confining board 17 connected with a connection barrel 18 of a hollow construction on the outer side of the second opening 16. The confining board 17 and the housing 11 form therebetween a sliding space, and a dust discharging port 19 for connecting the dust collecting bag 7.

A vacuum cleaner 20 is mounted in the receiving cell 12 of the fixation seat 10, and is capable of rotating and drawing dust by suction from the first opening 14 and second opening 16 of the fixation seat 10.

A first window 30 is a square shape controllably and slidably disposed at the first opening 14 of the fixation seat 10, and has a dust panel 31 with two sides being confined in the two confining edges 15 of the fixation seat 10 to enable the first opening 14 of the fixation seat 10 to be close or open, a pull edge 33 for hand to hold to actuate, and a position stopping edge 35 for preventing the first window 30 to become detached.

A second window 40 is a square shape controllably and slidably disposed at the second opening 16 of the fixation seat 10, and has a dust panel 41 capable of sliding in the confining board 17 of the fixation seat 10 so as to enable the second opening 16 of the fixation seat 10 to be close or open, a pull edge 43 for hand to hold to actuate, and a position stopping pillar 45 to prevent the second window 40 from being detached.

Figure 5:
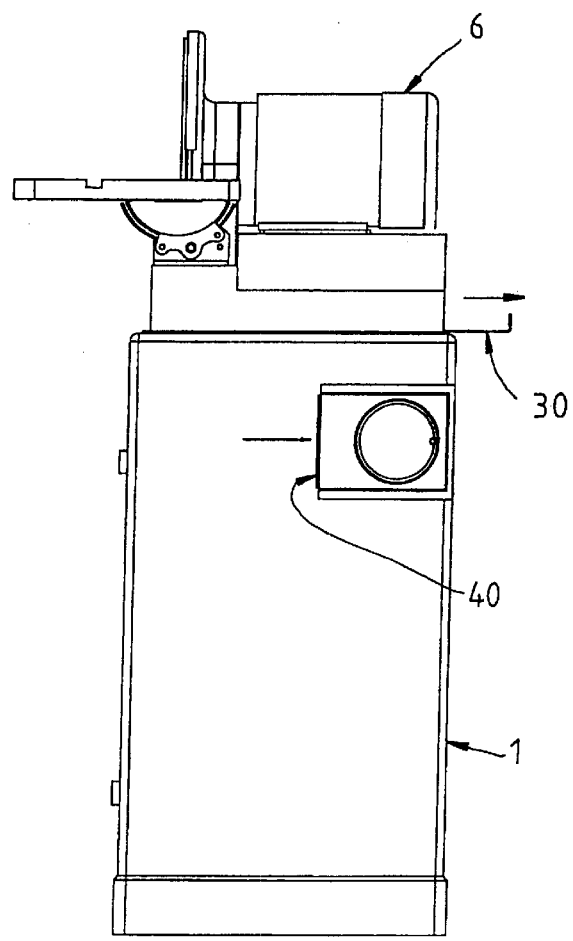
FIG. 5 is a side view of the preferred embodiment of the present invention and the machine tool in combination to show that the first opening is open and that the second opening is close.

As shown in FIG. 5, the first window 30 is operated to slide so as to enable the first opening 14 of the fixation seat 10 to be in the open state. The second window 40 enables the second opening 16 of the fixation seat 10 to be in the close state, thereby enabling the vacuum cleaner 20 to remove the dust produced by the machine tool 6 from the first opening 14 of the fixation seat 10.

Figure 6:
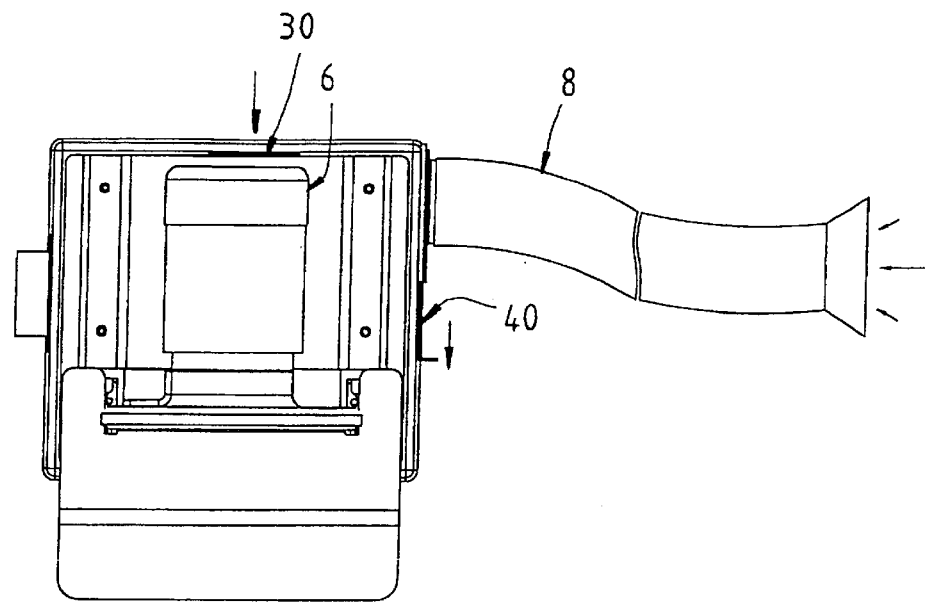
FIG. 6 is a top view of the preferred embodiment of the present invention and the machine tool in combination to show that the first opening is close and that the second opening is open and connected with the extension tube.

As shown in FIG. 6, the first opening 14 of the fixation seat 10 is kept in the close state by means of the first window 30. The second window 40 enables the second opening 16 of the fixation seat 10 to be in the open state. The extension tube 8 is connected with the second opening 16 for removing the dust in other areas.

The present invention has dust collecting action and dust drawing action, thanks to the combination of the embodiments in conjunction with various operating modes.

The preferred embodiment of the present invention has the following features.

The present invention is used as a device for collecting dust and drawing dust. The present invention is used to control the collection of dust produced by the machine tool. The present invention is connected with an extension tube to remove the dust in other areas.

The combination of the dust collecting and drawing device of the present invention avoids the addition of other vacuum cleaner. The present invention is simple in construction and easy to operate. The present invention is cost-effective.

What is claimed is:

1. A device capable of collecting and drawing dust, said device provided with a machine tool mounted thereon, said device being externally connected with an extension tube, said dust collecting and drawing device comprising:

a fixation seat being airtightly closed and having a housing, a mounting portion for mounting the machine tool, a first opening corresponding in location to the machine tool, a second opening located at a predetermined position of one side of said housing;

a vacuum cleaner disposed in the interior of said fixation seat, and capable of drawing dust by suction from the first opening and second opening of the fixation seat;

a first window disposed controllably and slidably at the first opening of said fixation seat so as to enable the first opening of said fixation seat to be in the closed or open state;

a second window disposed controllably and slidably at the second opening of said fixation seat so as to enable the second opening of said fixation seat to be in the closed or open state;

with said first window being open and said second window being closed, said vacuum cleaner being capable of removing dust that is produced by the machine tool; with said first window being closed and said second window being open, said second opening being capable of drawing dust in other areas via said extension tube.

2. The device as defined in claim 1, wherein said first opening of said fixation seat and said first window both are in a square shape.

3. The device as defined in claim 1, wherein said second opening of said fixation seat and said second window both are in a square shape.

4. The device as defined in claim 1, wherein said first opening of said fixation seat is provided in two sides with two confining edges for confining the sliding of said first window.

5. The device as defined in claim 1, wherein said second opening of said fixation seat is externally connected with a connection barrel of a hollow construction.

6. The device as defined in claim 1, wherein said second opening of said fixation seat is provided with a confining board, and a sliding space formed therebetween for confining the sliding of said second window and for preventing said second window from slipping out.

7. The device as defined in claim 1, wherein said first window is provided with a pull edge for hand to hold to operate.

8. The device as defined in claim 1, wherein said second window is provided with a pull edge for hand to hold to operate.

9. The device as defined in claim 1, wherein said first window further has a position stopping edge.

10. The device as defined in claim 1, wherein said second window further has a position stopping pillar.

* * * * *